United States Patent [19]

Sandefur et al.

[11] Patent Number: 5,120,858

[45] Date of Patent: Jun. 9, 1992

[54] PROCESS FOR THE PREPARATION OF TRIMETHINE DYESTUFFS

[75] Inventors: Charles W. Sandefur, Summerville; Brian L. Thompson, Goose Creek; James J. Good, Charleston, all of S.C.

[73] Assignee: Miles Inc., Pittsburgh, Pa.

[21] Appl. No.: 675,344

[22] Filed: Mar. 25, 1991

[51] Int. Cl.$^5$ .............................................. C09B 23/06
[52] U.S. Cl. .................................... 548/455; 548/454; 576/176
[58] Field of Search ........................................ 548/455

[56] References Cited

U.S. PATENT DOCUMENTS

| | | | |
|---|---|---|---|
| 1,886,485 | 11/1932 | Kuhn et al. | 548/455 |
| 4,419,511 | 12/1983 | Raue | 542/471 |

FOREIGN PATENT DOCUMENTS

| | | |
|---|---|---|
| 599560 | 7/1934 | Fed. Rep. of Germany . |
| 0578435 | 9/1924 | France ........... 548/455 |
| 775578 | 1/1935 | France . |
| 136391 | 1/1930 | Switzerland ........ 548/455 |
| 232740 | 4/1925 | United Kingdom . |
| 328357 | 5/1930 | United Kingdom . |

*Primary Examiner*—David B. Springer
*Attorney, Agent, or Firm*—Joseph C. Gil; Richard E. L. Henderson

[57] ABSTRACT

This invention relates to a process for preparing trimethine dyestuffs of the formula

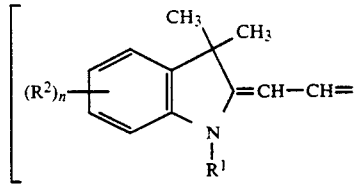

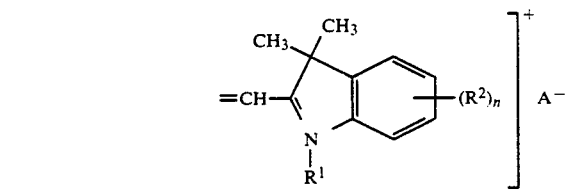

wherein $R^1$ is lower alkyl; $R^2$ is hydrogen, alkyl, cycloalkyl, aryl, aralkyl, alkoxy, cycloalkoxy, aryloxy, aralkoxy, fluorinated alkyl, alkanoyl, aroyl, alkoxycarbonyl, aryloxycarbonyl, aralkoxycarbonyl, alkanoylamino, aroylamino, alkylaminocarbonyl, arylaminocarbonyl, alkoxycarbonylamino, alkylsulfonyl, arylsulfonyl, halogen, cyano, nitro, carbamoyl, or sulfonamido, or two $R^2$ together form a fused benzene ring; n is an integer of from 1 to 4; and $A^-$ is an anion, by reacting a mixture of (a) an indoline compound of the formula

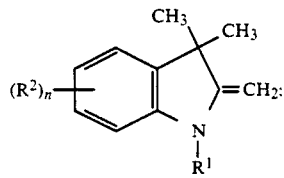

(b) 1.25 to 1.8 parts by moles, based on the indoline compound, of acetic anhydride; and (c) 0.5 to 0.75 parts by moles, based on the indoline compound, of formic acid to form the dyestuff.

18 Claims, No Drawings

PROCESS FOR THE PREPARATION OF TRIMETHINE DYESTUFFS

BACKGROUND OF THE INVENTION

This invention relates to the preparation of trimethine dyestuffs by reacting a mixture of methylene-substituted indoline compounds with acetic anhydride and formic acid.

The preparation of trimethine dyestuffs is well known. For example, British Patent 232,740 discloses the reaction of certain cyclic ammonium salts having reactive α- or γ-methyl groups (including α-methylindoleninium salts) with orthoformic esters or formic acid salts. This method, however, was found to be unsuitable for the preparation of certain substitution products of polymethine dyestuffs. Moreover, even when usable, this method can give rise to various undesirable by-products, such as alkyl acetates and alkyl iodides.

British Patent 328,357 and German Patent 599,560 disclose a method for preparing polymethine dyestuffs that are not accessible by the method of British Patent 232,740. These later references describe the condensation of cyclic ammonium salts having reactive α- or γ-methyl groups (including the iodide salt of 1,3,3-trimethyl-2-methyleneindoline) with formic acid or a salt of formic acid in a large excess of acetic anhydride. This method, however, has significant deficiencies, particularly when using formic acid as the free acid. For example, according to U.S. Pat. No. 4,419,511, the use of acetic anhydride can partially acetylate the 2-methyleneindoline. In addition, the formation of acetic formic anhydride, a highly reactive mixed anhydride, is believed to play a role in the condensation reaction. Although alkali metal salts of formic acid react readily with acetic anhydride, the free acid reacts less extensively. Consequently, the uniform preparation of stable dyestuff solutions is not obtained when using free formic acid.

One approach intended to avoid the disadvantages of the previously described methods is disclosed, for example, in French Patent 775,578. In this method, a 2-methyleneindoline (e.g., formula (A) in which R is hydrogen) reacts with the corresponding aldehyde (e.g., formula (A) in which R is —CH=O) under dehydrating conditions, such as provided by using phosphorus oxychloride in benzene or even hot anhydrous pyridine.

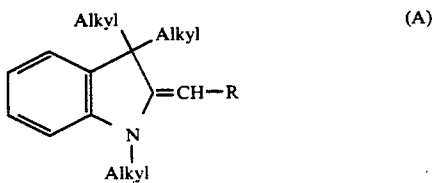

(A)

An obvious disadvantage of this method, however, is the additional preparative steps required to obtain the aldehydes.

The method of U.S. Pat. No. 4,419,511 was intended to avoid the disadvantages of the previously described methods by using alkali metal salts of formic acid in a mixture of acetic acid and acetic anhydride. The presence of sodium ions in the resultant dyestuff, however, apparently affects the stability of concentrated solutions. For example, Example 2 of the reference teaches that acetic acid, ethylene glycol, and an emulsifier based on ethylene oxide and oleyl alcohol must be added to prevent the precipitation of the dyestuff from a concentrated solution. Alternatively, the dyestuffs could be isolated as a solid and then redissolved in the absence of salts. The desirability of avoiding the use of salts is apparent.

An object of the present invention, therefore, was the preparation of trimethine dyestuff concentrates without the disadvantages of the previous methods. It has surprisingly been found that the condensation of concentrated solutions of 2-methyleneindoline and formic acid in acetic anhydride provides an efficient method for preparing trimethine dyestuffs that are stable in solution even as concentrates.

SUMMARY OF THE INVENTION

This invention relates to a process for the preparation of a trimethine dyestuff of formula (I)

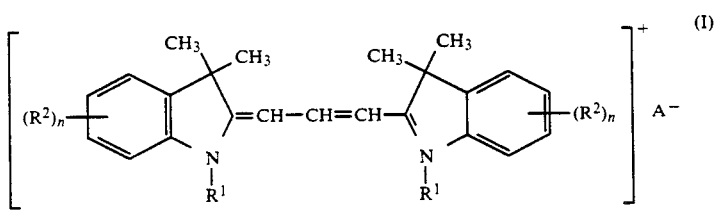

wherein
$R^1$ is $C_1$-$C_6$ alkyl;
$R^2$ is hydrogen, $C_1$-$C_6$ alkyl, $C_5$-$C_7$ cycloalkyl, $C_6$-$C_{10}$ aryl, $C_7$-$C_{15}$ aralkyl, $C_1$-$C_6$ alkoxy, cycloalkoxy, $C_6$-$C_{10}$ aryloxy, $C_7$-$C_{15}$ aralkoxy, $C_1$-$C_4$ fluorinated alkyl, $C_2$-$C_6$ alkanoyl, $C_7$-$C_{11}$ aroyl, $C_2$-$C_7$ alkoxycarbonyl, $C_7$-$C_{11}$ aryloxycarbony , $C_8$-$C_{16}$ aralkoxycarbonyl, $C$ -$C_6$ alkanoylamino or $C_2$-$C_6$ alkanoylamino N-substituted with $C_1$-$C_6$ alkyl or $C_6$-$C_{10}$ aryl, $C_7$-$C_{11}$ aroylamino or aroylamino N-substituted with $C_1$-$C_6$ alkyl or aryl, $C_2$-$C_7$ alkylaminocarbonyl or $C_2$-$C_7$ alkylaminocarbonyl N-substituted with alkyl or aryl, 1 arylaminocarbonyl or $C_7$-$C_{11}$ arylaminocarbonyl N-substituted with alkyl or aryl, alkoxycarbonylamino, $C_1$-$C_6$ alkylsulfonyl, $C_6$-$C_{10}$ arylsulfonyl, halogen, cyano, nitro, carbamoyl, or sulfonamido, or two $R^2$ together form a fused benzene ring;
n is an integer of from 1 to 4; and
$A^-$ is an anion (preferably acetate);
comprising reacting a mixture of
(a) an indoline compound of formula (II)

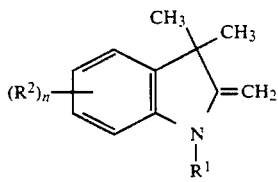

(II)

wherein $R^1$, $R^2$, and n are as defined above;
(b) about 1.25 to about 1.8 parts by moles, based on the indoline compound, of a bis alkanoic) anhydride (preferably acetic anhydride); and
(c) about 0.5 to about 0.75 parts by moles, based on the indoline compound, of formic acid to form said trimethine dyestuff of formula (I).

DETAILED DESCRIPTION OF THE INVENTION

The process of the present invention is applicable to the preparation of trimethine dyestuffs of formula (1) having a variety of substituents $R^1$ and $R^2$ which can provide differing properties for the resultant dyestuffs but which do not otherwise significantly affect the chemistry of the condensation reaction.

The term "C alkyl" refers to straight or branched chain aliphatic hydrocarbon groups having from 1 to 6 carbon atoms, also referred to as lower alkyl. Examples of $C_1$–$C_6$ alkyl are methyl, ethyl, propyl, butyl, pentyl, hexyl, and the isomeric forms thereof. The term "$C_5$–$C_7$ cycloalkyl" refers to cycloaliphatic hydrocarbon groups having from 5 to 7 carbon atoms. Examples of $C_5$–$C_7$ cycloalkyl are cyclopentyl, cyclohexyl, and cycloheptyl.

The term "aryl" refers to phenyl and 1- or 2-naphthyl. As used herein, the term "aryl" also refers to phenyl and naphthyl groups further substituted with alkyl, alkoxy, halogen, cyano, and nitro as defined herein.

The term "aralkyl" refers to $C_1$–$C_6$ alkyl substituted with $C_6$–$C_1O$ aryl such that the total number of carbon atoms is from 6 to 15. Examples of $C_7$–$C_{15}$ aralkyl are benzyl, phenethyl, and naphthylmethyl.

The term "$C_1$–$C_6$ alkoxy" refers to straight or branched chain alkyl oxy groups having from 1 to 6 carbon atoms. Examples of $C_1$–$C_6$ alkoxy are methoxy, ethoxy, propoxy, butoxy, pentyloxy, hexyloxy, and the isomeric forms thereof. The term "$C_5$–$C_7$ cycloalkoxy" refers to cycloalkyl oxy groups having from 5 to 7 carbon atoms. Examples of $C_5$–$C_7$ cycloalkoxy are cyclopentyloxy, cyclohexyloxy, and cycloheptyloxy. The term "$C_6$–$C_{10}$ aryloxy" refers to phenoxy and 1- or 2-naphthoxy, in which the aryl portion can optionally be substituted as described above for "aryl." The term "$C_7$–$C_{15}$ aralkoxy" refers to $C_1$–$C_6$ alkoxy substituted with $C_7$–$C_{10}$ aryl such that the total number of carbon atoms is from 7 to 15. An example of $C_7$–$C_{15}$ aralkoxy is benzyloxy.

The term "fluorinated alkyl" refers to straight or branched chain $C_1$–$C_4$ alkyl groups in which one or more hydrogen atoms are replaced with fluorine atoms. Examples of $C_1$–$C_4$ fluorinated alkyl are fluoromethyl, difluoromethyl, trifluoromethyl, 1- or 2-fluoroethyl, 1,1-difluoroethyl, 2,2,2-trifluoroethyl, perfluoroethyl; other similarly monofluorinated, polyfluorinated, and perfluorinated ethyl, propyl, and butyl groups; and the isomeric forms thereof.

The term "alkanoyl" refers to straight or branched chain alkanoyl groups having from 2 to 6 carbon atoms. Examples of $C_2$–$C_6$ alkanoyl are acetyl, propanoyl, butanoyl, pentanoyl, hexanoyl, and the isomeric forms thereof. The term "$C_7$–$C_{11}$ aroyl" refers to benzoyl and 1- or 2-naphthoyl.

The term "$C_2$–$C_7$ alkoxycarbonyl" refers to straight or branched chain alkoxycarbonyl groups having from 2 to 7 carbon atoms. Examples of $C_2$–$C_7$ alkoxycarbonyl are methoxycarbonyl, ethoxycarbonyl, propoxycarbonyl, butoxycarbonyl, pentyloxycarbonyl, hexyloxycarbonyl, and the isomeric forms thereof. The term "$C_7$–$C_{11}$ aryloxycarbonyl" refers to phenoxycarbonyl and 1- or 2-naphthoxycarbonyl. The term "$C_8$–$C_{16}$ aralkoxycarbonyl" refers to $C_2$–$C_7$ alkoxycarbonyl substituted with aryl such that the total number of carbon atoms is from 8 to 16. An example of $C_8$–$C_{16}$ aralkoxycarbonyl is benzyloxycarbonyl (also known as carbobenzoxy).

The term "$C_2$–$C_6$ alkanoylamino" refers to straight or branched chain alkanoylamino groups having from 2 to 6 carbon atoms. Examples of $C_2$–$C_6$ alkanoylamino are acetamido, propanoylamino, butanoylamino, pentanoylamino, hexanoylamino, and the isomeric forms thereof. The term "aroylamino" refers to benzamido and 1- or 2-naphthoylamino. Such alkanoylamino or aroylamino groups can optionally be N-substituted with alkyl or aryl groups.

The term "$C_2$–$C_7$ alkylaminocarbonyl" refers to straight or branched chain alkylamino-substituted carbonyl groups having from 2 to 7 carbon atoms. Examples of $C_2$–$C_7$ alkanoylamino are methylaminocarbonyl (also known as N-methylcarbamoyl), ethylaminocarbonyl, and the like. The term "$C_7$–$C_{11}$ arylaminocarbonyl" refers to phenylaminocarbonyl (or anilinocarbonyl) and 1- or 2-naphthylaminocarbonyl. Such alkylaminocarbonyl or arylaminocarbonyl groups can optionally be N-substituted with alkyl or aryl groups. The term "carbamoyl" refers to an unsubstituted aminocarbonyl group.

The term "$C_2$–$C_7$ alkoxycarbonylamino" refers to straight or branched chain alkoxycarbonyl groups having from 2 to 7 carbon atoms. Examples of $C_2$–$C_7$ alkoxycarbonyl are methoxycarbonyl, ethoxycarbonyl, propoxycarbonyl, butoxycarbonyl, pentyloxycarbonyl, hexyloxycarbonyl, and the isomeric forms thereof.

The term "alkylsulfonyl" refers to straight or branched chain alkylsulfonyl groups having from 1 to 6 carbon atoms. Examples of $C_1$–$C_6$ alkylsulfonyl are methylsulfonyl (also known as mesyl) and ethanesulfonyl. The term "arylsulfonyl" refers to phenylsulfonyl and 1- or 2-naphthylsulfonyl, as well as optionally substituted forms such as toluenesulfonyl (also known as tosyl).

Examples of halogen are fluorine, chlorine, bromine, and iodine.

Thus, suitable examples of indoline compounds of formula (11) include 1,3,3-trimethyl-2-methylene-2,3-dihydroindole, 1,3,3,5-tetramethyl-2-methylene-2,3-dihydroindole, 1,3,3,7-tetramethyl-2-methylene-2,3-dihydroindole, 1,3,3-trimethyl-5-chloro-2-methylene-2,3-dihydroin dole, 1,3,3-trimethyl-5-fluoro-2-methylene-2,3-dihydroindole, 1,3,3-trimethyl -5-methoxy-2-methylene-2,3-dihydroindole, 1,3,3-trimethyl -5-ethoxy-2-methylene-2,3-dihydroindole, 1,3,3-trimethyl -5-(4-methylphenoxy)-2-methylene-2,3-dihydroindole, 1,3,3-trimethyl-5-(3-methoxyphenoxy)-2-methylene-2,3-dihydroindole, 1,3,3-trimethyl-5-(4-methoxyphenoxy)-2-methylene-2,3-dihydroindole, 1,3,3-trimethyl-5-(4-chlorophenoxy)-2-methylene-2,3-dihydroindole, 1,3,3-trimethyl-5-carbomethoxy-2-methylene-2,3-dihydroindole, 1,3,3-trimethyl-5-carboethoxy-2-methylene-2,3-dihydroindole, 1,3,3-trimethyl-5-cyclohexyl-2-methylene-2,3-dihydroindole, 1,3,3-trimethyl-5-benzyl-2-methylene-2,3-dihydroindole, 1,3,3-trimethyl-5-benzyloxy-2-methylene-2,3-dihydroindole, 1,3,3-trimethyl-5-(p-methylbenzyloxy)-2-methylene-2,3-dihydroindole, 1,3,3-trimethyl-5-(o-methylbenzyloxy)-2-methylene-2,3-dihydroindole, 1,3,3-trimethyl -5-(p-chlorobenzyloxy)-2-methylene-2,3-dihydroindole, 1,3,3-trimethyl-5-trifluoromethyl-2-methylene-2,3-dihydroindole, 1,3,3-trimethyl-5-nitro-2-methylene-2,3-dihydroindole, 1,3,3-trimethyl-5-cyano-2-methylene-2,3-dihydroindole, 1,3,3-trimethyl -5-acetylamino-2-methylene-2,3-dihydroindole, 1,3,3-trimethyl -5-methylsulfonyl-2-methylene-2,3-dihydroindole, 1,3,3-trimethyl-5-phenylsulfonyl-2-methylene-2,3-dihydroindole, 1,3,3-trimethyl-5-sulfonamido-2-methylene-2,3-dihydroindole, 1,3,3-trimethyl-7-ethyl-2-methylene-2,3-dihydroindole, 1,3,3-trimethyl -7-chloro-2-methylene-2,3-dihydroindole, 1,3,3-trimethyl -7-methoxy-2-methylene-2,3-dihydroindole, 1,3,3-trimethyl -7-ethoxy-2-methylene-2,3-dihydroindole, 1,3,3-trimethyl -7-phenoxy-2-methylene-2,3-dihydroindole, 1,3,3,-trimethyl-7-(4-methoxyphenoxy)-2-methylene-2,3-dihydroindole, 1,3,3-trimethyl-7-(3-methylphenoxy)-2-methylene-2,3-dihydroindole, 1,3,3-trimethyl-7-benzyloxy-2-methylene-2,3-dihydroindole, 1,3,3-trimethyl-7-(p-methylbenzyloxy)-2-methylene-2,3-dihydroindole, 1,3,3-trimethyl-7-(o-chlorobenzyloxy)-2-ethylene-2,3-dihydroindole, 1,3,3-trimethyl-6,7-benzo-2-methylene-2,3-dihydroindole, 1-ethyl-3,3-dimethyl-2-methylene-2,3-dihydroindole, 1-ethyl-3,3,5-trimethyl-2-methylene-2,3-dihydroindole, 1-ethyl-3,3-dimethyl-5-chloro-2-methylene-2,3-dihydroindole, 1-ethyl-3,3-dimethyl-5-methoxy-2-methylene-2,3-dihydroindole, 1-ethyl-3,3-dimethyl-5-carbomethoxy-b 2-methylene-2,3-dihydroindole, 1-ethyl-3,3-dimethyl-5-carboethoxy-2-methylene-2,3-dihydroindole, 1-ethyl-3,3,7-trimethyl-5-cyclohexyl-2-methylene-2,3-dihydroindole, 1-ethyl-3,3-dimethyl-5-benzyl-2-methylene-2,3-dihydroindole, 1-ethyl-3,3-dimethyl-5-benzyloxy-2-methylene-2,3-dihydroindole, 1-ethyl-3,3-dimethyl-5-nitro-2-methylene-2,3-dihydroindole, 1,3,3-trimethyl-4,5-dichloro-2-methylene-2,3-dihydroindole, 1,3,3-trimethyl-4,6-dicarbomethoxy-2-methylene-2,3-dihydroindole, 1,3,3,5-tetramethyl-4-benzyloxy-2-methylene-2,3-dihydroindole, 1,3,3,5-tetramethyl-5-benzyloxy-2-methylene-2,3-dihydroindole, 1,3,3,5-tetramethyl-6-benzyloxy-2-methylene-2,3-dihydroindole, 1,3,3,5-tetramethyl-7-(p-methylbenzyloxy)-2-methylene-2,3-dihydroindole, 1,3,3-trimethyl-4-chloro-7-methoxy-2-methylene-2,3-dihydroindole, 1,3,3-trimethyl-5-chloro-7-methoxy-2-methylene-2,3-dihydroindole, 1,3,3-trimethyl-4-methoxy-5-benzyloxy-2-methylene-2,3-dihydroindole, 1,3,3-trimethyl-6-methoxy-5-benzyloxy-2-methylene-2,3-dihydroindole, 1,3,3-trimethyl-5-benzyloxy-7-methyl-2-methylene-2,3-dihydroindole, 1,3,3-trimethyl-5-chloro-4,7-dimethoxy-2-methylene-2,3-dihydroindole, 1,3,3,4,5,7-hexamethyl-2-methylene-2,3-dihydroindole, and 1,3,3,4,6,7-hexamethyl-2-methylene-2,3-dihydroindole.

The process of the invention is particularly useful for the preparation of trimethine dyestuffs from indoline compound of formula (11) in which $R^2$ is hydrogen, $C_1$-$C_6$ alkyl, or halogen. Although other indoline compounds are less preferred, the specific kind and number of substituents $R^2$ do not usually significantly affect the effectiveness of the process of the invention.

The process of the invention is carried out by mixing a suitable indoline compound of formula (II) with about 1.25 to about 1.8 moles of a suitable bis($C_2$-$C_6$ alkanoic) anhydride and about 0.5 to about 0.75 moles of formic acid for each mole of the indoline compound. Suitable bis alkanoic) anhydrides are carboxylic acid anhydrides based on straight or branched chain $C_2$-$C_6$ alkanoic acids and are liquid under the reaction conditions used. Examples of suitable anhydrides are acetic anhydride, propanoic anhydride, butyric anhydride, valeric anhydride, caproic anhydride, and the isomeric forms thereof. Acetic anhydride is preferred. In a preferred embodiment, 1.25 to 1.60 parts by moles of acetic anhydride and 0.5 to 0.55 parts by moles of formic acid are used. The indoline compound is preferably first added to cooled acetic anhydride before addition of the formic acid. Preferred temperatures for initial addition are below about 10° C. and are more preferably in the range of about −5° C. to about +5° C. The reaction mixture is allowed to warm during the addition of formic acid, although it is preferable to maintain a temperature of less than about 10-15° C. until addition is complete. After all of the components have been added, the reaction mixture is warmed, preferably in stages. The temperature at which the condensation reaction is brought to completion is preferably selected to be high enough to optimize the rate of reaction but not so high as to cause excessive decomposition of the mixed anhydride (or other components) but is otherwise not critical. Thus, after all of the components have been added, the reaction mixture is preferably initially allowed to warm to room temperature. After about one hour, the mixture can then be heated at, for example, about 50° to 80° C. until the condensation reaction is complete, typically within 24 hours.

Residual anhydride can be hydrolyzed by addition of water or solvolyzed by addition of another protic solvent such as ethanol or methanol. Although the resultant concentrates prepared according to the invention are stable, the concentrates can, if desired, be diluted by addition of any suitable solvent or diluent, particularly acetic acid.

Trimethine dyestuffs in which $A^-$ is an anion other than acetate can be prepared by any of the methods known in the art, for example, by precipitation with a mineral acid and salting out. Although generally not suitable, it is possible to prepare some salts of certain trimethine dyestuffs by heterogeneous ion exchange. Some of the salts can be further concentrated to obtain solids.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

DESCRIPTION OF THE PREFERRED EMBODIMENTS

In the following examples, the yield of each sample of dyestuff was determined spectroscopically by comparing the absorbance of the experimental sample with the absorbance of a known amount of a pure sample at a given visible wavelength (i.e., the wavelength of maximum absorbance).

Spectro strength of a sample is the ratio of the absorbance of a given quantity of the sample to the absorbance of the same quantity of a market standard (which is VERONA Paper Red P (C. I. Basic Red 12)) at a given visible wavelength.

Shade is determined by comparison of the dyestuff with a market standard (which is VERONA Paper Red P (C. I. Basic Red 12)) and is reported using the following scale based on the AATCC Gray Scale:

| | | |
|---|---|---|
| 0 = equal | | |
| +1 = trace yellow | −1 = trace blue | |
| +2 = slight yellow | −2 = slight blue | |
| +3 = distinct yellow | −3 = distinct blue | |
| +4 = considerable yellow | −4 = considerable blue | |
| +5 = much yellow | −5 = much blue | |
| +6 = off-shade yellow | −6 = off-shade blue | |

EXAMPLE 1

A mixture of 120.6 g (1.18 mole) of acetic anhydride and 130.2 g (0.75 mole) of 1,3,3-trimethyl-2-methyleneindoline ("trimethyl base") was cooled to 0°–5° C. Formic acid (95%) (19.1 g, 0.39 mole) was then added dropwise over 4 to 5 hours at a temperature held at 10°–12° C. (The molar ratios were 0.52 (formic acid) to 1.6 (acetic anhydride) to 1.0 (trimethyl base).) When the addition was complete, the mixture was allowed to warm to 20°–25° C. over a period of one hour and then held at 20°–25° C. for an additional hour. The mixture was then heated to 50°–53° C. over a period of one hour and then held at that temperature for 18 hours. After 14.5 g (0.81 mole) of water was added to hydrolyze unreacted acetic anhydride, the mixture was cooled to room temperature and diluted with 47 ml of glacial acetic acid to provide a stable liquid concentrate containing 146 g (93.5% of theory, as determined spectroscopically) of the dyestuff having the following formula:

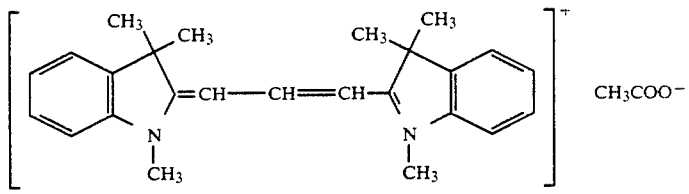

EXAMPLE 2

The procedure of Example 1 was carried out using 156.0 g (0.75 mole) of 1,3,3-trimethyl-5-chloro-2-methyleneindoline to yield a stable liquid concentrate containing 123.4 g of the dyestuff having the following formula:

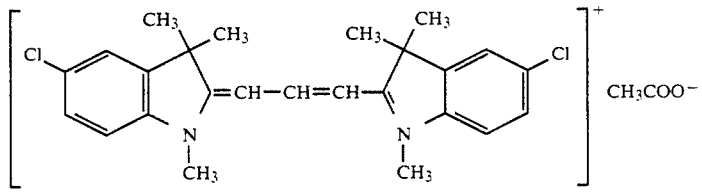

EXAMPLE 3

(variation of molar ratios)

The procedure of Example 1 was carried out using the quantities listed in Table 1. Yields and properties are also summarized in Table 1.

TABLE 1

| Example | Component | Moles | Molar ratio | Yield (% of theory) | Spectro strength (%) | Shade |
|---|---|---|---|---|---|---|
| 3a | Trimethyl base | 0.618 | 1.00 | 72.5 | 87.3 | +2 |
| | Ac$_2$O[(1)] | 1.148 | 1.86 | | | |
| | Formic acid | 0.734 | 1.19 | | | |
| 3b | Trimethyl base | 0.751 | 1.00 | 78.5 | 110.7 | +2 |
| | Ac$_2$O | 1.016 | 1.35 | | | |
| | Formic acid | 0.563 | 0.75 | | | |
| 3c | Trimethyl base | 0.751 | 1.00 | 84.4 | 129.7 | +4 |
| | Ac$_2$O | 0.937 | 1.25 | | | |
| | Formic acid | 0.402 | 0.54 | | | |
| 3d | Trimethyl base | 0.751 | 1.00 | 93.5 | 142.2 | +4 |
| | Ac$_2$O | 0.937 | 1.25 | | | |
| | Formic acid | 0.393 | 0.52 | | | |

[(1)]Ac$_2$O represents acetic anhydride.

Example 3a, which uses a molar quantity of formic acid outside the range of 0.5–0.75, gives inferior yield and spectro strength when compared to Examples 3b, 3c, and 3d of the invention. Use of formic acid in the lower part of the molar quantity range (Examples 3c and 3d) provides the best properties.

EXAMPLE 4

(comparisons based on British Patent 328,357)

A comparison experiment according to Example 4 of British Patent 328,357 was carried out as follows. Into a solution at 40° C. of 19 g (0.41 mole) of formic acid in 300 g (2.9 mole) of acetic anhydride was introduced with stirring over a period of six hours a solution of 52 g (0.30 mole) of 1,3,3-trimethyl-2-methyleneindoline ("trimethyl base") in 500 g (4.9 mole) of acetic anhydride. (The molar ratios were 1.4 (formic acid) to 26.0 (acetic anhydride) to 1.0 (trimethyl base).) The temperature was maintained at 40° C. for 16 hours, after which a portion of the acetic anhydride was distilled off in vacuo. The resultant solution had a spectro strength of 59% compared to market standard and contained 44.1 g (71% of theory, as determined spectroscopically) of the product prepared in Example 1. Thin-layer chromatography using 3:1 toluene/methanol and 7:5:2 butyl acetate/acetic acid/water on silica gel indicated higher levels of impurities than present in the product of Example 1.

The yield of dyestuff obtained from this process was approximately 24% lower than that obtained in Example 1. Moreover, because the reaction mixture was more dilute than that of Example 1, preparation of a liquid concentrate having the same concentration would require the distillation of approximately 88% of the volume.

EXAMPLE 5

(comparisons based on U.S. Patent 4,419,511)

Comparison Example 5a was based on Example 2 of U.S. Pat. No. 4,419,511 except that quantities were adjusted proportionately so that 0.751 mole of trimethyl base were used. This experiment, which uses sodium formate, produced the trimethine dyestuff in good yields but at a much lower concentration relative to dyestuff solutions prepared according to the present invention (e.g., Examples 1 and 3).

Comparison Example 5b was based on Example 2 of U.S. Pat. No. 4,419,511 but used formic acid instead of sodium formate. Despite the use of formic acid, the trimethine dyestuff was formed in only moderate yields and at a much lower concentration relative to dyestuff solutions prepared according to the present invention.

Comparison Example 5c was based on Example 1 above but used sodium formate instead of formic acid. The product was prepared in low yield and solidified on cooling. Spectro strength was low and shade could not be determined.

Table 2 summarizes quantities used, yields, and properties. The concentrates were diluted with the indicated components to provide stable liquid dyes (except for Example 5c, which did not give a liquid product).

TABLE 2

| Example | Component | Moles | Molar ratio | Yield (% of theory) | Spectro strength (%) | Shade |
|---|---|---|---|---|---|---|
| 5a | Trimethyl base | 0.751 | 1.00 | 79.6 | 46.5 | +3.5 |
|  | Ac$_2$O | 1.275 | 1.70 |  |  |  |
|  | Acetic acid | 2.167 | 2.89 |  |  |  |
|  | Sodium formate | 0.891 | 1.19 |  |  |  |
|  | Diluent: |  |  |  |  |  |
|  | AVOLAN IW[1] | — | — |  |  |  |
|  | EG[2] | 0.786 | 1.05 |  |  |  |
|  | Acetic acid | 0.538 | 0.72 |  |  |  |
|  | Water | 5.062 | 6.74 |  |  |  |
| 5b | Trimethyl base | 0.751 | 1.00 | 68.8 | 41.9 | +2 |
|  | Ac$_2$O | 1.275 | 1.70 |  |  |  |
|  | Acetic acid | 2.167 | 2.89 |  |  |  |
|  | Formic acid | 0.891 | 1.19 |  |  |  |
|  | Diluent: |  |  |  |  |  |
|  | AVOLAN IW | — | — |  |  |  |
|  | EG | 0.786 | 1.05 |  |  |  |
|  | Acetic acid | 0.538 | 0.72 |  |  |  |
|  | Water | 5.062 | 6.74 |  |  |  |
| 5c | Trimethyl base | 0.751 | 1.00 | — | 19.7 | — |
|  | Ac$_2$O | 1.190 | 1.58 |  |  |  |
|  | Sodium formate | 0.390 | 0.52 |  |  |  |
|  | Water | 0.690 | 0.54 |  |  |  |

[1]AVOLAN IW emulsifier based on ethylene oxide and oleyl alcohol (available from Mobay Corporation, Pittsburgh, PA).
[2]EG represents ethylene glycol.

What is claimed is:

1. A process for the preparation of a trimethine dyestuff of the formula

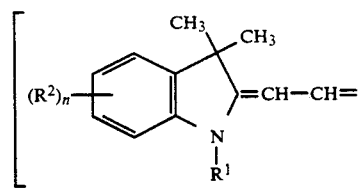

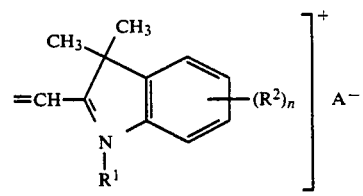

wherein
R$^1$ is alkyl;
R$^2$ is hydrogen, C$_1$-C$_6$ alkyl, cycloalky C$_6$-C$_{10}$ aryl, C$_7$-C$_{15}$ aralkyl, C$_1$-C$_6$ alkoxy, C$_5$-C$_7$ cycloalkoxy, C$_6$-C$_{10}$ aryloxy, C$_7$-C$_{15}$ aralkoxy, fluorinated alkyl, alkanoyl, aroyl, C$_2$-C$_7$ alkoxycarbonyl, C$_7$-C$_{11}$ aryloxycarbony, C$_8$-C$_{16}$ aralkoxycarbonyl, C$_2$-C$_6$ alkanoylamino or C$_2$-C$_6$ alkanoylamino N-substituted with -C$_6$ alkyl or C$_6$-C$_{10}$ aryl, C$_7$-C$_{11}$ aroylamino N-substituted with C$_1$-C$_6$ alkyl or C$_6$-C$_{10}$ aryl, C$_2$-C$_7$ alkylaminocarbonyl or C$_2$-C$_7$ alkylaminocarbonyl N-substituted with C$_1$-C$_6$ alkyl or C$_6$-C$_{10}$ aryl, C$_7$-C$_{11}$ arylaminocarbonyl or C$_7$-C$_{11}$ arylaminocarbonyl N-substituted with C$_1$-C$_6$ alkyl or aryl, C$_2$-C$_7$ alkoxycarbonylamino, C$_1$-C$_6$ alkylsulfony arylsulfonyl, halogen, cyano, nitro, carbamoyl, or sulfonamido, or two R$^2$ together form a fused benzene ring;

n is an integer of from 1 to 4; and

A$^-$ is an anion;

comprising reacting a mixture of
(a) an indoline compound of the formula

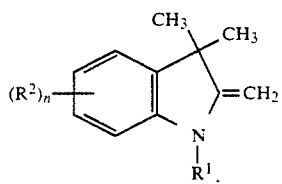

wherein R$^1$, R$^2$, and n are as defined above;
(b) 1.25 to 1.8 parts by moles, based on the indoline compound, of a bi alkanoic) anhydride; and
(c) 0.5 to 0.75 parts by moles, based on the indoline compound, of formic acid to form said trimethine dyestuff.

2. A process according to claim 1 wherein R$^2$ is hydrogen, C$_1$-C$_6$ alkyl, or halogen.

3. A process according to claim 1 wherein n is 1.

4. A process according to claim 1 wherein A$^-$ is acetate.

5. A process according to claim 1 wherein the bis(-C$_2$-C$_6$ alkanoic) anhydride is acetic anhydride.

6. A process according to claim 1 for the preparation of a trimethine dyestuff of the formula

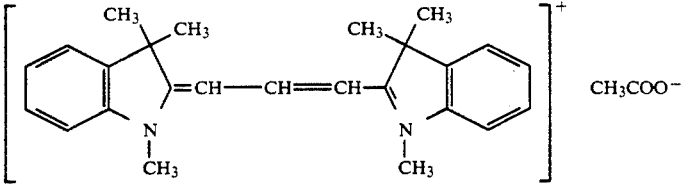

comprising reacting a mixture of
(a) an indoline compound of the formula

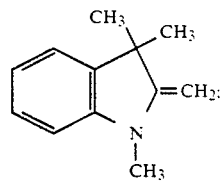

(b) 1.25 to 1.8 parts by moles, based on the indoline compound, of acetic anhydride; and
(c) 0.5 to 0.75 parts by moles, based on the indoline compound, of formic acid to form said trimethine dyestuff.

7. A process according to claim 1 for the preparation of a trimethine dyestuff of the formula

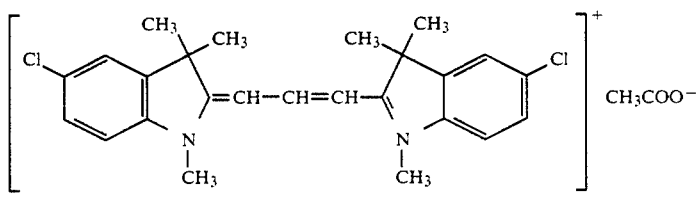

comprising reacting a mixture of
(a) an indoline compound of the formula

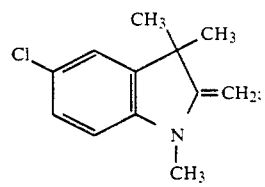

(b) 1.25 to 1.8 parts by moles, based on the indoline compound, of acetic anhydride; and
(c) 0.5 to 0.75 parts by moles, based on the indoline compound, of formic acid to form said trimethine dyestuff.

8. A process according to claim 1 wherein the indoline compound (a) and the bis alkanoic) anhydride are mixed at a temperature below 10° C. before the formic acid is added.

9. A process according to claim 5 wherein the indoline compound (a) and acetic anhydride are mixed at a temperature below 10° C. before the formic acid is added.

10. A process according to claim 5 wherein the indoline compound (a) and acetic anhydride are mixed at a temperature of from −5° C. to 5° C. before the formic acid is added.

11. A process according to claim 1 wherein the indoline compound (a) and the bis alkanoic) anhydride are mixed at a temperature below 10° C. before the formic acid is added and wherein the temperature is maintained at less than 15° C. during the addition of the formic acid.

12. A process according to claim 5 wherein the indoline compound (a) and acetic anhydride are mixed at a temperature below 10° C. before the formic acid is added and wherein the temperature is maintained at less than 15° C. during the addition of the formic acid.

13. A process according to claim 1, additionally comprising hydrolyzing or solvolyzing residual bis($C_2$–$C_6$ alkanoic) anhydride after the trimethine dyestuff is formed.

14. A process according to claim 5 additionally comprising hydrolyzing or solvolyzing residual acetic anhydride after the trimethine dyestuff is formed.

15. A process according to claim 1 additionally comprising adding solvent or diluent after the trimethine dyestuff is formed.

16. A process according to claim 1 additionally comprising
   (i) hydrolyzing or solvolyzing residual bis($C_2$–$C_6$ alkanoic) anhydride after the trimethine dyestuff is formed and
   (ii) adding solvent or diluent after residual bis($C_2$–$C_6$ alkanoic) anhydride is hydrolyzed or solvolyzed.

17. A process according to claim 15 wherein the solvent or diluent is acetic anhydride.

18. A process according to claim 16 wherein the solvent or diluent is acetic anhydride.

* * * * *